(No Model.) 2 Sheets—Sheet 1.

M. P. C. HOOPER.
MOSQUITO TRAP.

No. 455,403. Patented July 7, 1891.

Attest.
Geo. H. Botts.
J. M. Borst

Inventor
Mary P. Carpenter Hooper
by Phelps, Phelps & Henry
Attys (No Model.) 2 Sheets—Sheet 2.

M. P. C. HOOPER.
MOSQUITO TRAP.

No. 455,403. Patented July 7, 1891.

Attest:
L. H. Pott.
G. M. Borst

Inventor
Mary P Carpenter Hooper
by Philipp Phelps & Hover
Attys

UNITED STATES PATENT OFFICE.

MARY P. CARPENTER HOOPER, OF NEW YORK, N. Y.

MOSQUITO-TRAP.

SPECIFICATION forming part of Letters Patent No. 455,403, dated July 7, 1891.

Application filed June 6, 1890. Serial No. 354,488. (No model.)

*To all whom it may concern:*

Be it known that I, MARY P. CARPENTER HOOPER, a citizen of the United States, residing at New York city, county of New York and State of New York, have invented certain new and useful Improvements in Mosquito-Traps, fully described and represented in the following specification and the accompanying drawings, forming a part of the same.

This invention relates to the manufacture of traps designed for the capture of mosquitoes; and the invention consists in an interiorly-illuminated box or cylinder provided with a plurality of perforations so formed therein that said perforations shall have their greatest width at the surface of the box or cylinder and gradually contract toward the interior of the same, so that the opening at this point shall be of a diameter only just sufficient to permit the passage of a mosquito into the box or cylinder, the illumination of the box or cylinder attracting the mosquitoes, which will enter the same, their exit from the box or cylinder being rendered impossible by the peculiar formation of its perforations, which are the only means of ingress and egress provided.

Figure 1:
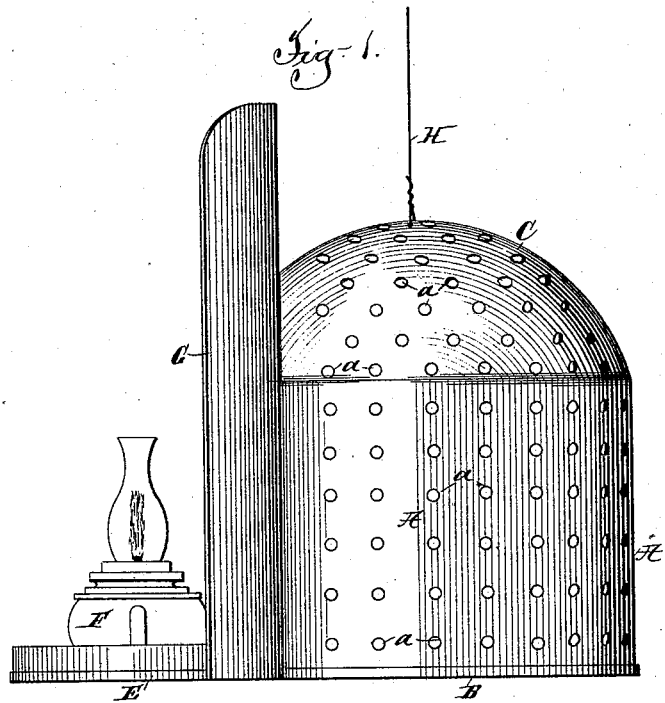
Figure 2:
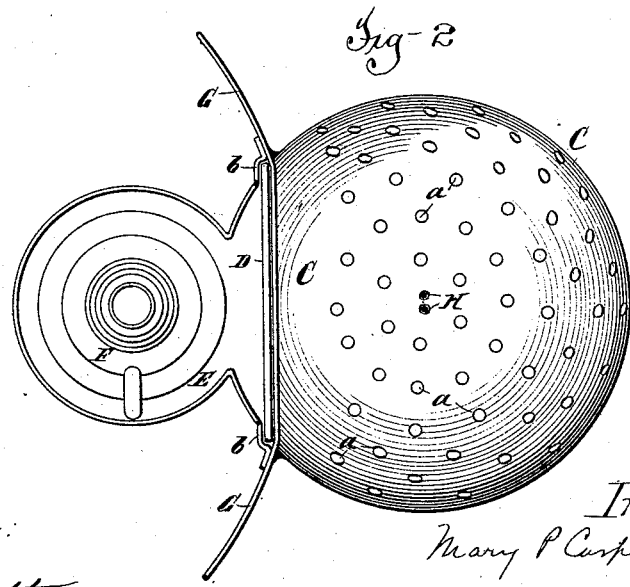
Figure 3:
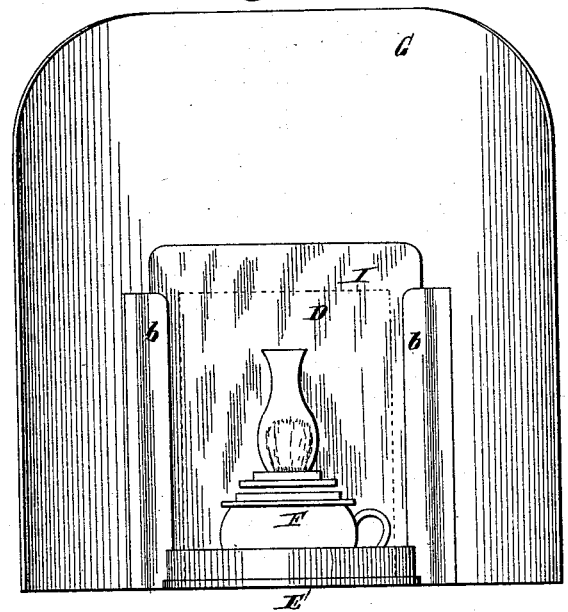
Figure 4:
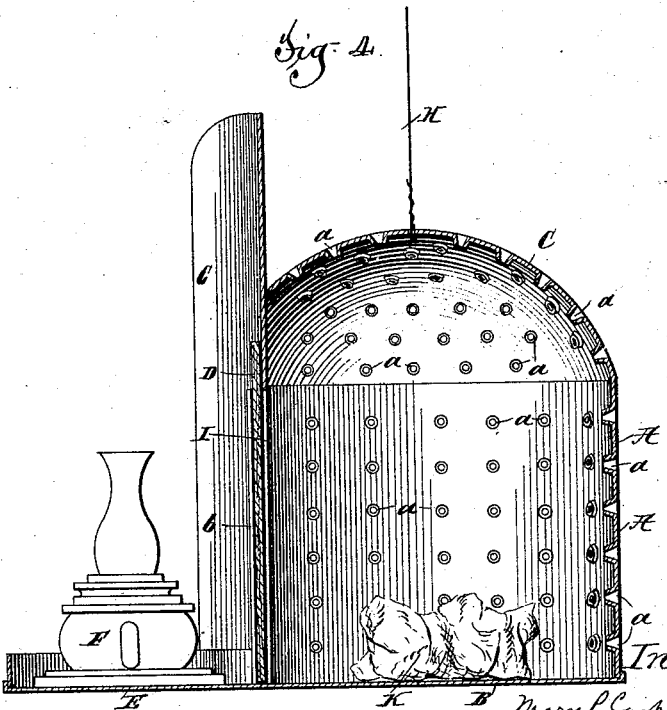

In the accompanying drawings, Figure 1 is a side view of a mosquito-trap constructed according to the present invention. Fig. 2 is a plan view, and Fig. 3 is a front view, of the same; and Fig. 4 is a central vertical section of Fig. 3.

Referring to said drawings, it will be understood that the trap proper consists of a cylinder A, preferably of metal, provided with a dome-shaped top C, and a bottom B, soldered or otherwise secured thereto. The vertical portion and dome of said cylinder are provided with a plurality of perforations a, preferably punched therein, the diameters of which decrease as they approach the interior of the cylinder, so that at their inner edges they are of considerably less width than at the surface of the cylinder, as shown in Fig. 4. At their inner edges these perforations a are of a size just about sufficient to permit the passage of the body of a mosquito. The cylinder A is provided with an opening I, closed when the trap is set by a glass plate D, movable vertically in guides d, and the bottom B of the cylinder is extended beneath this opening a sufficient distance outwardly from said opening to form a shelf E for receiving a small lamp F, which, when in position upon the shelf, will be directly in front of the opening I in the cylinder. When the lamp is in this position, it will shed its rays into the interior of the cylinder A, so as to illuminate the same, this illumination serving to attract the mosquito. The trap also is provided with a shade G interposed between the lamp and cylinder and of a height and width greater than the height and width of the cylinder A, the side edges of which shade are curved inwardly toward the lamp, as shown. This shade is provided for the purpose of deflecting the rays of the lamp upward away from the exterior surface of the cylinder, which would tend to destroy the effect of its interior illumination. The shade G is formed with an opening at its lower portion registering with the opening I in the cylinder A, no obstruction being offered by it to the rays of the lamp which pass into the interior of the cylinder.

For the sake of economy in manufacture the trap will preferably be formed in two pieces, the vertical and top portions of the cylinder being stamped from a single sheet of metal and the bottom B and shelf E from another, the two parts thus formed being then soldered together or otherwise united, the perforations a being stamped in the cylinder either before or after such union.

The manner of using the trap just described is as follows: The trap having been provided with a suitable bait H, placed therein through the opening I, the glass plate D having been raised for this purpose, it will then be suspended by means of a cord J in a room or other place frequented by mosquitoes. The lamp F, being then lighted, will shed its rays into and illuminate the interior of the cylinder A. This illumination of the cylinder, which will be visible through the perforations a therein, will attract the mosquitos into the trap, into which they will be induced to enter through the perforations a by the presence of the bait K. Their escape from the cylinder will be prevented by the peculiar formation of the perforations a, which taper outwardly to the surface of the cylinder and the inner ends of which are of a size only just sufficient to permit the entrance of the mosquitoes. When these perforations are punched in the cylinder, as illustrated, their inner edges will be somewhat jagged, and this will aid in preventing the exit of the trapped mosquitoes from the cylinder A. The mosquitoes thus trapped may be drowned by submerging the trap in water, or may be destroyed in any other manner.

Instead of suspending the trap in the manner just described, it may be placed in position upon a table, mantel, or other suitable place. The shelf E also, when the trap is not intended to be suspended, may be omitted, the lamp F being placed upon the table, mantel, or other place in its proper position in front of the opening I. It is also to be understood that the trap, instead of being of the form shown, may be of any other form, either cylindrical or otherwise, and that instead of being made from sheet metal it may be made of any other suitable material.

What I claim is—

1. A mosquito-trap consisting of a closed box or cylinder having an opening for the admission of light, and an illuminating device in front of said opening for illuminating the interior of said box or cylinder, said box or cylinder being provided with suitable perforations permitting the entrance of mosquitoes, but preventing their exit, substantially as described.

2. A mosquito-trap consisting of a closed box or cylinder having a glass-covered opening, and an illuminating device in front of said opening for illuminating the interior of said box or cylinder, said box or cylinder being provided with suitable perforations permitting the entrance of mosquitoes, but preventing their exit, substantially as described.

3. A mosquito-trap consisting of a closed box or cylinder having a glass-covered opening and provided with a shelf in front of said opening, and an illuminating device upon said shelf for illuminating the interior of said box or cylinder, the latter being provided with suitable perforations permitting the entrance of mosquitoes, but preventing their exit, substantially as described.

4. A mosquito-trap consisting of a closed box or cylinder having an opening for the admission of light and provided with suitable perforations permitting the entrance of mosquitoes, but preventing their exit, and an illuminating device in front of said opening for illuminating the interior of said box or cylinder, the bottom of said box or cylinder being elongated to form a shelf for said illuminating device, substantially as described.

5. A mosquito-trap consisting of a closed box or cylinder having an opening for the admission of light and provided with suitable perforations permitting the entrance of mosquitoes, but preventing their exit, the vertical and top portions of said box being formed from a single sheet of metal and its bottom being elongated to form a shelf in front of said opening, and an illuminating device upon said shelf for illuminating the interior of said box or cylinder, substantially as described.

6. The combination, with a mosquito-trap consisting of a perforated closed box or cylinder having an opening for the admission of light, and an illuminating device in front of said opening for illuminating the interior of said box or cylinder, of the shade G, deflecting the rays of light away from the exterior surface of the box or cylinder, substantially as described.

7. The combination, with the box or cylinder A, provided with suitable perforations permitting the entrance of mosquitoes, but preventing their exit, having an opening I, of the glass plate D for closing said opening, the shelf E and the lamp F upon said shelf for illuminating the interior of said box or cylinder, and the shade G, substantially as described.

8. A mosquito-trap consisting of an interiorly-illuminated closed box or cylinder provided with suitable inwardly-extending tapered perforations, the inner edges of which are contracted so as to permit the entrance of a mosquito, but to prevent its exit, substantially as described.

In testimony whereof I have hereunto set my hand in the presence of two subscribing witnesses.

MARY P. CARPENTER HOOPER.

Witnesses:
C. J. SAWYER,
J. J. KENNEDY.